United States Patent
Weltrowski et al.

(10) Patent No.: US 6,660,804 B1
(45) Date of Patent: Dec. 9, 2003

(54) CYCLODEXTRIN POLYMERS AND/OR CYCLODEXTRIN DERIVATIVES WITH COMPLEXING PROPERTIES AND ION-EXCHANGE PROPERTIES AND METHOD FOR THE PRODUCTION THEREOF

(75) Inventors: Marek Weltrowski, Quebec (CA); Michel Morcellet, Villeneuve d'Ascq (FR); Bernard Martel, Erquinghem Lys (FR)

(73) Assignee: Universite des Sciences et Technologies de Lille, Villeneuve d'Ascq (FR)

( * ) Notice: Subject to any disclaimer, the term of this patent is extended or adjusted under 35 U.S.C. 154(b) by 0 days.

(21) Appl. No.: 09/913,475
(22) PCT Filed: Feb. 15, 2000
(86) PCT No.: PCT/FR00/00377
§ 371 (c)(1),
(2), (4) Date: Aug. 15, 2001
(87) PCT Pub. No.: WO00/47630
PCT Pub. Date: Aug. 17, 2000

(30) Foreign Application Priority Data

Feb. 15, 1999 (FR) ............................................. 99 01968

(51) Int. Cl.[7] ........................... C08G 63/91; C08L 5/16; C08B 37/16
(52) U.S. Cl. ..................... 525/54.23; 525/54.2; 524/48; 527/300; 536/103
(58) Field of Search .............................. 525/54.2, 54.23; 524/48; 536/103; 527/300

(56) References Cited

U.S. PATENT DOCUMENTS 5,646,131 A * 7/1997 Badwan et al. ................ 514/58
5,968,404 A * 10/1999 Trinh et al. ................ 252/8.91

FOREIGN PATENT DOCUMENTS

EP          0 502 194 A1     9/1992

* cited by examiner

Primary Examiner—James J. Seidleck
Assistant Examiner—Thao Tran
(74) Attorney, Agent, or Firm—Weingarten, Schurgin, Gagnebin & Lebovici LLP (57) ABSTRACT

The present invention concerns a process for preparing copolymers of cyclodextrin(s) and/or cyclodextrin derivative(s), characterized by the following operations: (a) preparing a solid state mixture of cyclodextrin(s) and/or cyclodextrin derivative(s) and/or inclusion complex(es) of cyclodextrin(s) and/or cyclodextrin derivative(s) and a poly(carboxylic) acid and/or a poly(carboxylic) acid anhydride or a mixture of poly(carboxylic) acid(s) and/or poly(carboxylic) acid anhydride(s), and optionally, a catalyst; and (b) heating the solid mixture to a temperature in the range 100° C. to 200° C. for a period in the range 1 min to 60 min, preferably 30 min or substantially 30 min. The present invention also concerns soluble and insoluble compounds of cyclodextrin(s) and/or cyclodextrin derivative(s) or their inclusion complexes with at least one poly(carboxylic) acid.

17 Claims, 8 Drawing Sheets

CYCLODEXTRIN POLYMERS AND/OR CYCLODEXTRIN DERIVATIVES WITH COMPLEXING PROPERTIES AND ION-EXCHANGE PROPERTIES AND METHOD FOR THE PRODUCTION THEREOF

FIELD OF THE INVENTION

The present invention relates to a process for producing soluble and insoluble copolymers of cyclodextrin(s) and/or cyclodextrin derivative(s) and polycarboxylic acid(s), and to soluble copolymers of cyclodextrin(s) and/or cyclodextrin derivative(s) and polycarboxylic acid(s).

BACKGROUND OF THE INVENTION

Cyclodextrins are cyclic oligomers composed of 6, 7 or 8 glucose units respectively termed α, β and γ cyclodextrin. The structure of the cyclodextrin molecule can be compared to a truncated cone the external portion of which has hydrophilic properties, while the interior forms a hydrophobic cavity that is capable of reversibly forming inclusion complexes with certain molecules of a hydrophobic nature. Due to that molecular structure, cyclodextrins have long been known to be molecules that are capable of reversibly trapping certain substrates of a hydrophobic nature, in particular aliphatic or aromatic molecules, from their solutions, vapors or solid mixtures. Cyclodextrin-substrate complexes are known as supramolecules or inclusion complexes.

A major disadvantage of cyclodextrins in their unrefined form is their relatively small size, which makes them difficult to extract from solutions, in particular using conventional membrane techniques. Further, their complexing properties and release properties may be limited by their low solubility, in particular in the case of β-cyclodextrin.

Cyclodextrin polymers, on the other hand, enjoy a number of advantages. Since they are much larger than cyclodextrins, they can be separated more easily from liquid media. An insoluble cyclodextrin polymer, for example, can be separated by filtration, and a soluble cyclodextrin polymer, for example, can be isolated by ultrafiltration or using any membrane technique.

The macromolecular structure of cyclodextrin polymers means that they can be considered to be polymeric materials.

The other advantage of cyclodextrin polymers is that the stability constants of the polymer-substrate complexes are often higher than those of cyclodextrin-substrate complexes. As a result, hydrophobic compounds and hydrophilic compounds are more readily complexed and less readily liberated by cyclodextrin polymers than by the cyclodextrins themselves. This property is particularly important for hydrophilic compounds that are not complexed, or are slightly complexed by cyclodextrins in their unrefined form.

Known cyclodextrin polymers can be soluble or insoluble in water depending on their structure.

Insoluble cyclodextrin polymers, for example, are used as separation materials in different chromatographic techniques, materials for absorbing undesirable substances or with high added value, or as a reservoir for active substances, for example drugs, pesticides, insecticides or the like, with a view to controlled release.

Soluble cyclodextrin polymers also have a wide range of applications. As an example, they possess good catalytic properties in esterolysis reactions and can enable controlled release of a substance through a membrane, or they can separate organic compounds from two-phase systems.

Three types of cyclodextrin polymer exist.

In the first polymer type, the cyclodextrin is not bonded to the polymer by a covalent bond. This is the case when the cyclodextrin forms a complex with the macromolecular chain of a polymer to form a necklace-like complex, termed a polyrotaxan, when the cyclodextrin forms an inclusion complex with hydrophobic side chains of a polymer (lateral polyrotaxan), or when the cyclodextrin is physically incorporated by simple mixing with a polymer.

In the next two polymer types, the cyclodextrin is covalently bonded to the polymer, either in the polymer backbone or as a substituent on the polymer chain. In both cases, polymer solubility depends on the molar mass of the polymer and on its degree of polymerization.

Methods for synthesizing cyclodextrin polymers, wherein cyclodextrin itself constitutes the backbone, frequently result in the simultaneous production of soluble and insoluble polymers; the soluble polymer/insoluble polymer weight ratio changes with the reaction parameters.

Such methods are based on the use of different bifunctional agents such as epichlorhydrin, dialdehydes, dibasic acids, diesters, dibasic acid dichlorides, diepoxides, diisocyanates or dihalogenated derivatives, polyisocyanates, ethylene glycol bis(epoxypropyl)ether, dibasic carboxylic acid dihalides in an organic solvent, , or phytic acid.

A process for producing cyclodextrin copolymers using epichlorhydrin has been proposed by Nestlé (NETH 6505361) and by Solms and Egli (Helv. Chim. Acta 48, 1225 (1965); U.S. Pat. No. 3,420,788). Similarly, a number of modifications to the epichlorhydrin cross-linking method were also proposed in documents GB 1 244 990, Wiedenhof N. et al., Die Stärke 21(5), 119–123 (1969), Hoffman J. L., J. Macromol. Sci-Chem., A7(5), 1147–1157 (1973), and in Japanese patents JP-A-58171404 and JP 61283601.

A process using a dialdehyde, a dibasic acid, a diester, a dibasic acid dichloride, a diepoxide, a diisocyanate or a dihalogenated derivative has been described in U.S. Pat. No. 3,472,835. This method proposes activating cyclodextrins by the action of metallic sodium in liquid ammonia followed by reaction with the bifunctional cross-linking agent.

A process using polyisocyanates in organic aprotic solvents has been disclosed in U.S. Pat. No. 4,917,956, Asanuma H. et al., Chem. Commun., 1971–1972 (1997) and in International patent WO-A-98 22197.

A process using ethylene glycol bis(epoxypropyl) ether was disclosed by Fenyvesi E., et al., in the document Ann. Univ. Sci. Budapest, Rolando Eotvos Nominatae, Sect. Chim. 15, 13–22 (1979). A process using other diepoxy compounds has also been described by Sugiura I., et al., in the document Bull. Chem. Soc. Jpn., (62, 1643–1651 (1989)).

A process using dibasic carboxylic acid dihalides in an organic solvent was developed in U.S. Pat. No. 4,958,015 and U.S. Pat. No. 4,902,788.

A process based on phytic acid, a polyphosphoric acid used to cross-link cyclodextrin by a vacuum heat treatment, has been described in U.S. Pat. No. 5,734,031.

In European patent EP-A-0 502 194, Yoshinaga proposed synthesizing cyclodextrin polymers of different natures such as polyurethane, polyurea, unsaturated polyesters, polyesters, polycarbonates, polyamides and polysulphones. Such polymers are obtained by a particular method that encourages the production of linear polymers, since only two of the alcohol functions react with the co-monomers. Such polymers, which contain no carboxylic acid functions, are intended to form degradable membranes with complexing properties.

A second type of polymer, where the cyclodextrin is a pendent group from a polymer chain, is produced by grafting cyclodextrin(s) or cyclodextrin derivative(s) to a pre-existing polymer chain. Halotriazine and halopyrimidine derivatives of cyclodextrins have been synthesized. Cyclodextrin grafting was carried out by reacting those derivatives with cellulose substances as described in German patent DE 19520989. Further, cyclodextrins have also been functionalized with aldehyde groups then grafted onto chitosan by a reductive amination reaction; such a reaction has been described by Tomoya T., et al., in J. Polym. Sci., Part A: Polym. Chem., 36 (11), 1965–1968 (1998).

Those cyclodextrin-based polymers can also be synthesized by functionalization thereof by polymerizable functional groups such as acryloyl or methacryloyl groups. Such functionalization is followed by polymerization or copolymerization of those derivatives. Such processes have been described in DE-A-4 009 825, by Wimmer T., et al., in Minutes Int. Symp. Cyclodextrins, 6$^{th}$ 106–109, (1992), Ed: Hedges A. L., pub. Sante Paris, by Harada et al., in Macromolecules 9(5), 701–704, (1976) and by Janus L. et al., in Reactive and Functional Polymers (in press).

Finally, a process using acrylates, acrylic acid and styrene, rendering the cyclodextrin insoluble by emulsion polymerization, has been described in EP-A-0 780 401.

The principal disadvantage of processes for cross-linking cyclodextrin with epichlorhydrin is that the latter reactant is corrosive and toxic. Similarly, processes based on the use of diepoxy compounds have proved to be toxic and expensive. Cross-linking with polyisocyanates and dibasic acid dihalides requires the use of organic solvents that are not environmentally friendly and thus cannot be used on a large scale. The approach consisting of transforming cyclodextrins into reactive derivatives that can react with polymers is also laborious and expensive.

Currently, the only non polluting method using cheap reactants is that described by Billy D. C. et al., in Proc. Int. Symp. Controlled Release Bioact. Mater. 24$^{th}$, 545–546 (1997). In that method, mixing poly(acrylic) acid with cyclodextrin in olive oil produces microspheres of insoluble cyclodextrin polymer complexed with oleic acid from the olive oil. However, that method cannot produce the insoluble polymer alone, i.e., not complexed with oleic acid. Further, the substantial reaction time (3 hours) and the way the process is implemented mean that it is not economical for use on an industrial scale.

BRIEF SUMMARY OF THE INVENTION

The present invention proposes a non polluting, cheap process for producing polymers based on cyclodextrin(s), which can be used on an industrial scale.

The process for producing soluble and insoluble polymers based on cyclodextrin(s) and/or cyclodextrin derivative(s) and/or inclusion complex(es) of cyclodextrin(s) and/or cyclodextrin derivative(s) is characterized by the following operations:

preparing a solid state mixture of cyclodextrin(s) and/or cyclodextrin derivative(s) and/or inclusion complex (es) of cyclodextrin(s) and/or cyclodextrin derivative(s) and a poly(carboxylic) acid and/or a poly(carboxylic) acid anhydride or a mixture of poly(carboxylic) acid(s) and/or poly(carboxylic) acid anhydride(s), and optionally, a catalyst;

heating the solid mixture to a temperature in the range 100° C. to 200° C. for a period in the range 1 minute (min) to 60 min, preferably 30 min or substantially 30 min.

Advantageously, the process of the present invention can be applied to an inclusion complex of cyclodextrin(s) or cyclodextrin derivative(s) (active agent complexed by cyclodextrin or a cyclodextrin derivative). A polymer obtained from an inclusion complex offers a better guarantee of cyclodextrin complexing properties; the presence of a complexing agent retains accessibility to the cavity of the cyclodextrin.

Heating condenses the hydroxyl groups of the cyclodextrin or cyclodextrin derivatives with the carboxylic acid groups of the poly(carboxylic) acid. A covalent ester type bond is formed between a cyclodextrin molecule or a cyclodextrin derivative molecule and a poly(carboxylic) acid molecule. When only two hydroxyl groups on each cyclodextrin molecule react with two distinct poly (carboxylic) acid molecules, a linear copolymer is formed. On the other hand, when three or more hydroxyl groups of the cyclodextrin form ester bonds with three or more distinct poly(carboxylic) acid molecules, a branched and/or cross-linked copolymer is formed. When the concatenation of molecules of cyclodextrin(s) and/or cyclodextrin derivative (s) molecules is more straight or slightly branched and has a low molar mass, the copolymer formed by that concatenation is soluble. When the chains form a three-dimensional network with a high molar mass, the copolymer obtained is insoluble.

DETAILED DESCRIPTION OF THE INVENTION

The reaction mechanism that results in copolymerization of the cyclodextrin(s) or cyclodextrin derivative(s) and a poly(carboxylic) acid or a mixture of poly(carboxylic) acids has not yet been elucidated. However, the mechanism should be similar to that described for cross-linking cellulose with poly(carboxylic) acids in the presence of a catalyst proposed by Welsh C. M. in American Dyestuff Reporter (83(9), 19–26 (1994)). In that mechanism, heating initially forms an anhydride from two of the carboxylic acid functions of the polyacid; that anhydride then reacts with a hydroxyl function of the cyclodextrin to form an ester bond. Another anhydride function is formed by condensation of two other carboxyl groups, and reacts with a hydroxyl function of another cyclodextrin molecule by forming a second ester bond. The mechanism can be represented by the following reaction sequence:

The process of the invention can produce polymers that comprise cyclodextrin and/or cyclodextrin derivative molecules in their backbone, as well as polymers chat comprise molecules of cyclodextrin(s) and/or cyclodextrin derivative (s) as substituents or side chains.

The process of the present invention is preferably carried out using poly(carboxylic) acids containing at least three carboxylic acid functions, such as poly(carboxylic) acid(s) that contain carboxylic acid functions such that under the effect of the heat treatment, those functions form a cyclic anhydride intermediate compound containing 5 or 6 carbon atoms.

The solid mixture of cyclodextrin(s) and/or cyclodextrin derivative(s) and/or inclusion complex(es) of cyclodextrin (s) and/or cyclodextrin derivative(s) and poly(carboxylic) acid(s) can be produced directly by mixing these products in the solid state. However, preferably, an aqueous solution of cyclodextrin(s) and/or cyclodextrin derivative(s) and/or inclusion complex(es) of cyclodextrin and/or cyclodextrin derivatives and a poly(carboxylic) acid or a poly(carboxylic) acid anhydride or a mixture of poly(carboxylic) acids and/or poly(carboxylic) acid anhydride(s) and optional catalyst is prepared, then the water is evaporated from this solution at a temperature in the range 40° C. to 100° C., preferably in vacuo at 90° C.

In a first variation of the process of the invention, which can produce an insoluble copolymer of cyclodextrin(s) or cyclodextrin derivative(s) and poly(carboxylic) acid(s), the solid product obtained after heating is washed with copious quantities of water.

Depending on the reaction conditions, it is possible to obtain either mainly a water-soluble copolymer or mainly a water-insoluble copolymer. In particular, the longer the reaction time and the higher the temperature, the longer the chains of the copolymer formed and/or the more branched the copolymer becomes, rendering it insoluble.

In this first variation, to obtain mainly an insoluble copolymer, the solid mixture is heated to a temperature of 150° C. or more, preferably 170° C. or substantially 170° C., for a period of 30 minutes or more, preferably in vacuo. The term "in vacuo" as used in the present invention means the pressure that can be reached using a glass water bath, i.e., a pressure of the order of $1.01 \times 10^4$ Pascals (Pa).

When the mixture is heated to a temperature of 180° C. or substantially 180° C., in vacuo for 30 minutes, a high yield of insoluble copolymers is obtained along with a very small quantity of water-soluble copolymers.

In a second variation, intended to produce mainly a soluble copolymer, the solid product obtained after heating is washed with water then filtered and the soluble copolymer is isolated from the filtrate, preferably by dialysis then freeze drying.

In this second variation, the mixture is heated to a temperature of 140° C. or more, for a period of 30 minutes or less, preferably in vacuo, to produce mainly soluble copolymer.

The maximum yield of soluble copolymers is obtained when the mixture is heated in vacuo to a temperature of 140° C. or substantially 140° C. for 30 minutes.

When the mixture is heated to a temperature of 130° C. or substantially 130° C. for 30 minutes, a very small quantity of insoluble copolymers is obtained.

Further, in these two variations, adding a catalyst to the mixture of cyclodextrin(s) or cyclodextrin derivative(s) or their inclusion complexes with poly(carboxylic) acid(s) and/or poly(carboxylic) acid anhydride(s) can increase the reaction yield.

The catalyst used is preferably selected from dihydrogen phosphates, hydrogen phosphates, phosphates, hypophosphites, alkali metal phosphites, alkali metal salts of polyphosphoric acids, carbonates, bicarbonates, acetates, borates, alkali metal hydroxides, aliphatic amines and ammonia, preferably selected from sodium hydrogen phosphate, sodium dihydrogen phosphate and sodium hypophosphite.

The process of the present invention is preferably applicable to cyclodextrin(s) selected from α-cyclodextrin, β-cyclodextrin and γ-cyclodextrin and to hydroxypropyl, methyl or acetyl derivatives of α-cyclodextrin, β-cyclodextrin and γ-cyclodextrin and to inclusion complexes formed from said cyclodextrins and said cyclodextrin derivatives.

Similarly, the poly(carboxylic) acid and poly(carboxylic) acid anhydride used in the process of the invention are preferably selected from the following poly(carboxylic) acids and poly(carboxylic) acid anhydrides: saturated and unsaturated acyclic poly(carboxylic) acids, saturated and unsaturated cyclic poly(carboxylic) acids, aromatic poly(carboxylic) acids, hydroxypoly(carboxylic) acids, preferably selected from citric acid, poly(acrylic) acid, poly (methacrylic) acid, 1,2,3,4-butanetetracarboxylic acid, maleic acid, citraconic acid, itaconic acid, 1,2,3-propanetricarboxylic acid, aconitic acid, all-cis-1,2,3,4-cyclopentanetetracarboxylic acid, mellitic acid, oxydisuccinic acid, and thiodisuccinic acid.

The present invention also concerns copolymers of cyclodextrin (s) and/or cyclodextrin derivative(s) and poly(carboxylic) acid(s) characterized in that the repeat unit has the following general formula:

in which y is the number of repetitions of the unit; and in which [CD] represents a α-cyclodextrin, β-cyclodextrin or γ-cyclodextrin molecule or an α-cyclodextrin, β-cyclodextrin or γ-cyclodextrin derivative, preferably a hydroxypropyl, methyl or acetyl α-cyclodextrin, β-cyclodextrin and γ-cyclodextrin derivative, or an inclusion complex of said cyclodextrins or said cyclodextrin derivatives; and reprsents the molecular chain of a poly(carboxylic) acid in which at least two carboxylic acid functions have been esterified and which supports at least one non esterified carboxylic acid function, wherein [AC] represents the carbon backbone of the poly(carboxylic) acid.

The insoluble and soluble copolymers of cyclodextrin(s) and/or cyclodextrin derivative(s) obtained by the process of the invention and the soluble copolymers that also constitute the subject matter of the invention are of importance in applications that are identical to those described above.

Further, the soluble and insoluble copolymers of cyclodextrin(s) obtained using the process of the invention have an ionic nature due to the presence of residual carboxylic acid functions that are carboxylic acid functions that have not been esterified. This type of copolymer with an ionic nature is desirable for different applications in separation and immobilization processes.

Further, the simultaneous presence, in the structure of the insoluble copolymers obtained using the process of the invention and in that of the soluble copolymers of the present invention, of carboxylic acid functions (possibility of cation exchange) and molecules of cyclodextrin(s) endows these copolymers with unique properties regarding water absorption and complexing odoriferous molecules. Thus, these copolymers can be used to produce sanitary products such as nappy pads, incontinence pads, sanitary liners and the like.

The following non limiting examples are given to better illustrate the process of the present invention and the soluble copolymers of the present invention.

EXAMPLE 1

25 ml of an aqueous solution containing 100 grams/liter (g/l) of β-cyclodextrin, 100 g/l of citric acid and 30 g/l of sodium hydrogen phosphate was prepared. The water was evaporated off from this solution in vacuo at 90° C. The solid residue from evaporation was heated in vacuo to 170° C. for 30 minutes. The solid reaction product was washed successively with three 60 milliliter (ml) volumes of water and with two 50 ml volumes of methanol. The first 60 ml wash water fraction was retained. The solid residue from washing was then dried at a temperature of 70° C. and weighed. The mass of insoluble cyclodextrin copolymer obtained was 3.8 g. The first fraction of 60 ml of wash water was dialyzed using a 12000–14000 dalton (d) membrane for 60 hours against distilled water. The resulting dialyzed solution was freeze dried: the mass of soluble cyclodextrin copolymer obtained was 0.1 g.

EXAMPLE 2

The process of the present invention was carried out as described in Example 1: the heating period was 15 min. The mass of insoluble cyclodextrin copolymer obtained was 2.3 g and the mass of soluble cyclodextrin copolymer obtained was 0.4 g.

Referring to Examples 1 and 2, FIGS. 1 to 4 show the influence of different parameters on the polymerization of β-cyclodextrin and citric acid.

Figure 1:
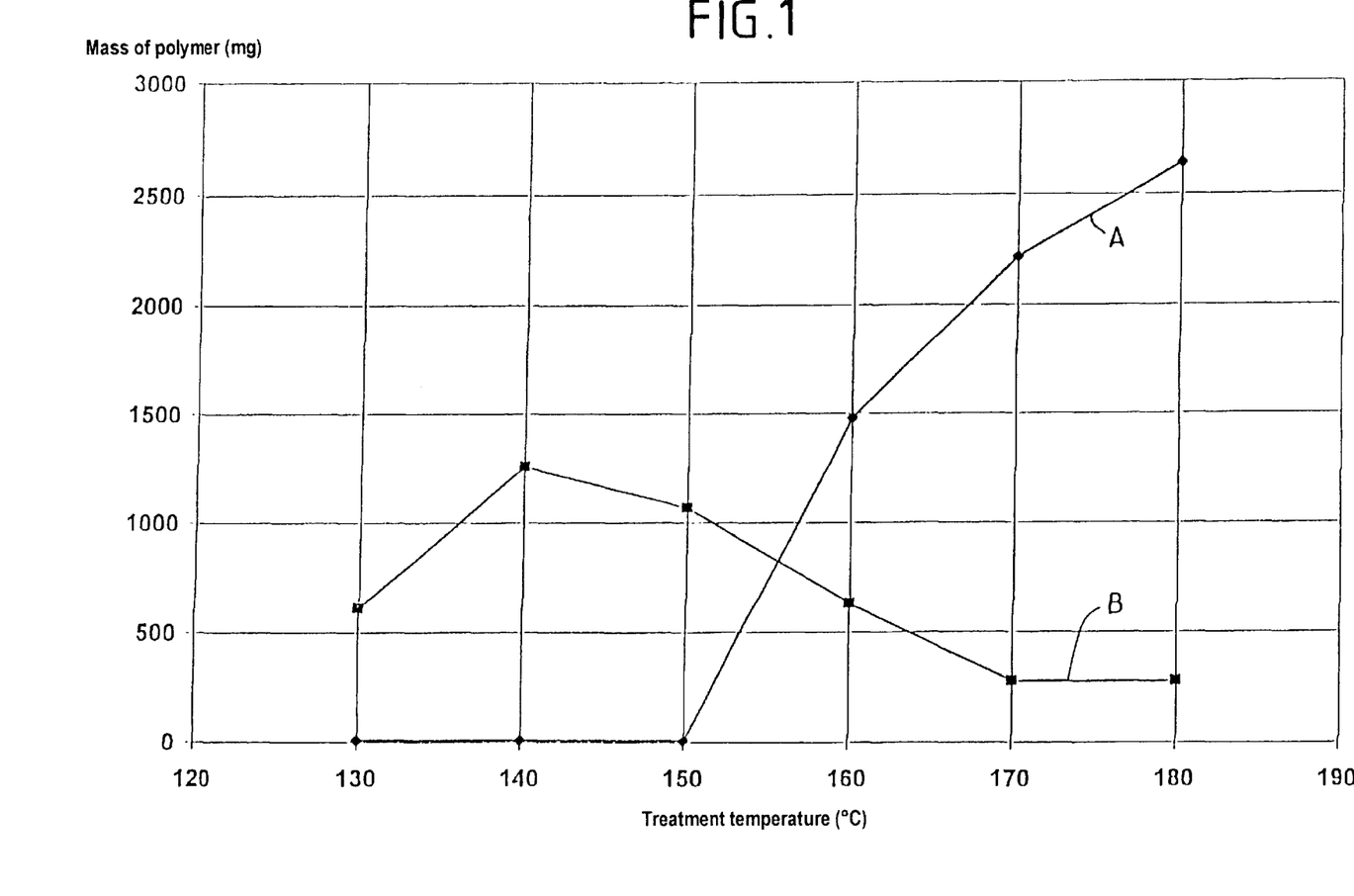
FIG. 1 shows the influence of temperature when the reaction is carried out at atmospheric pressure over 30 min.

FIG. 1 shows the influence of temperature when the reaction is carried out at atmospheric pressure over 30 min. Curve A of FIG. 1 represents the mass of insoluble copolymers obtained; curve B represents the mass of soluble copolymers obtained.

Figure 2:
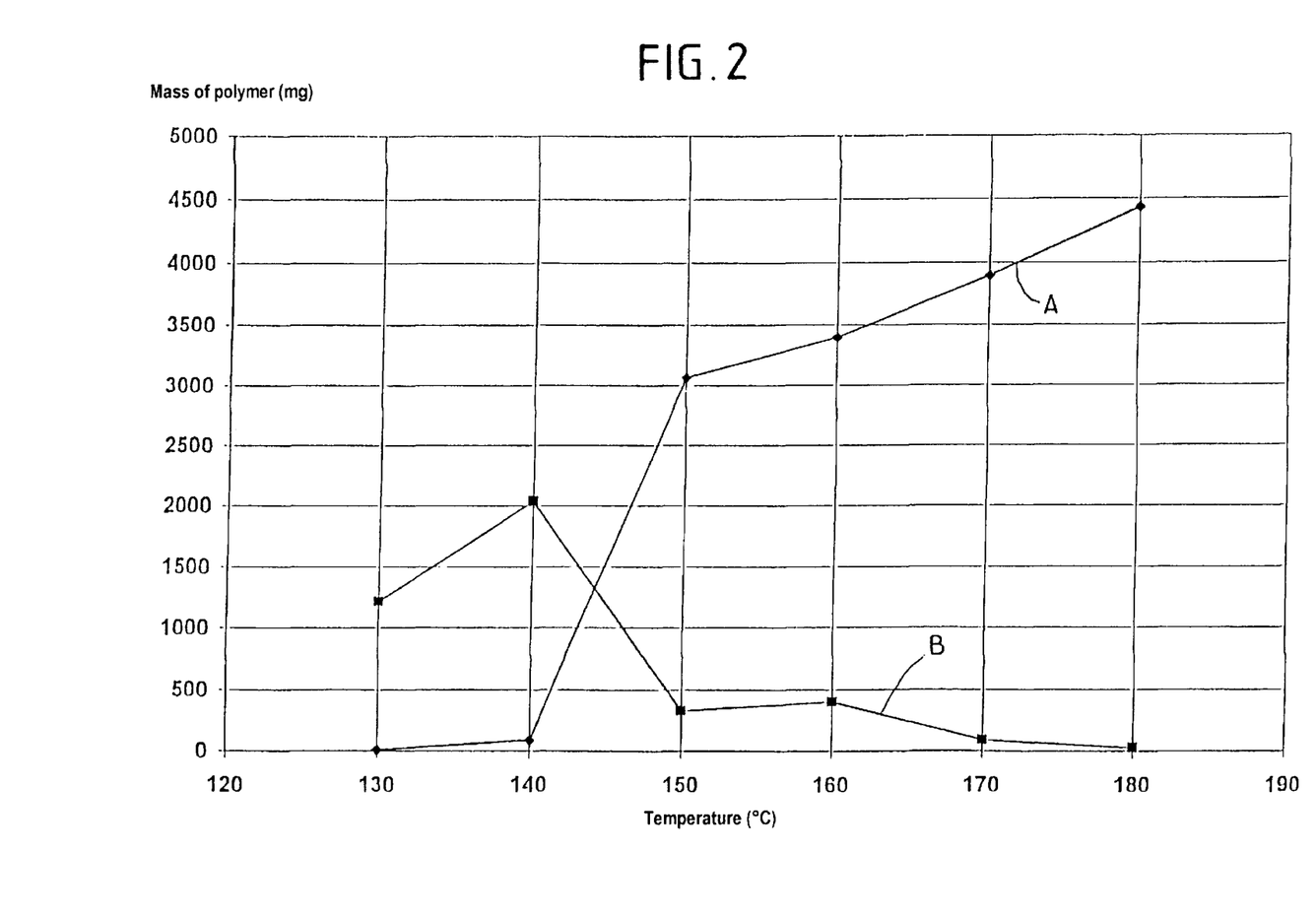
FIG. 2 shows the influence of temperature when the reaction is carried out in vacuo, over 30 min.

FIG. 2 shows the influence of temperature when the reaction is carried out in vacuo, over 30 min. Curve A of FIG. 2 represents the mass of insoluble copolymers obtained: curve B represents the mass of soluble copolymers obtained.

Figure 3:
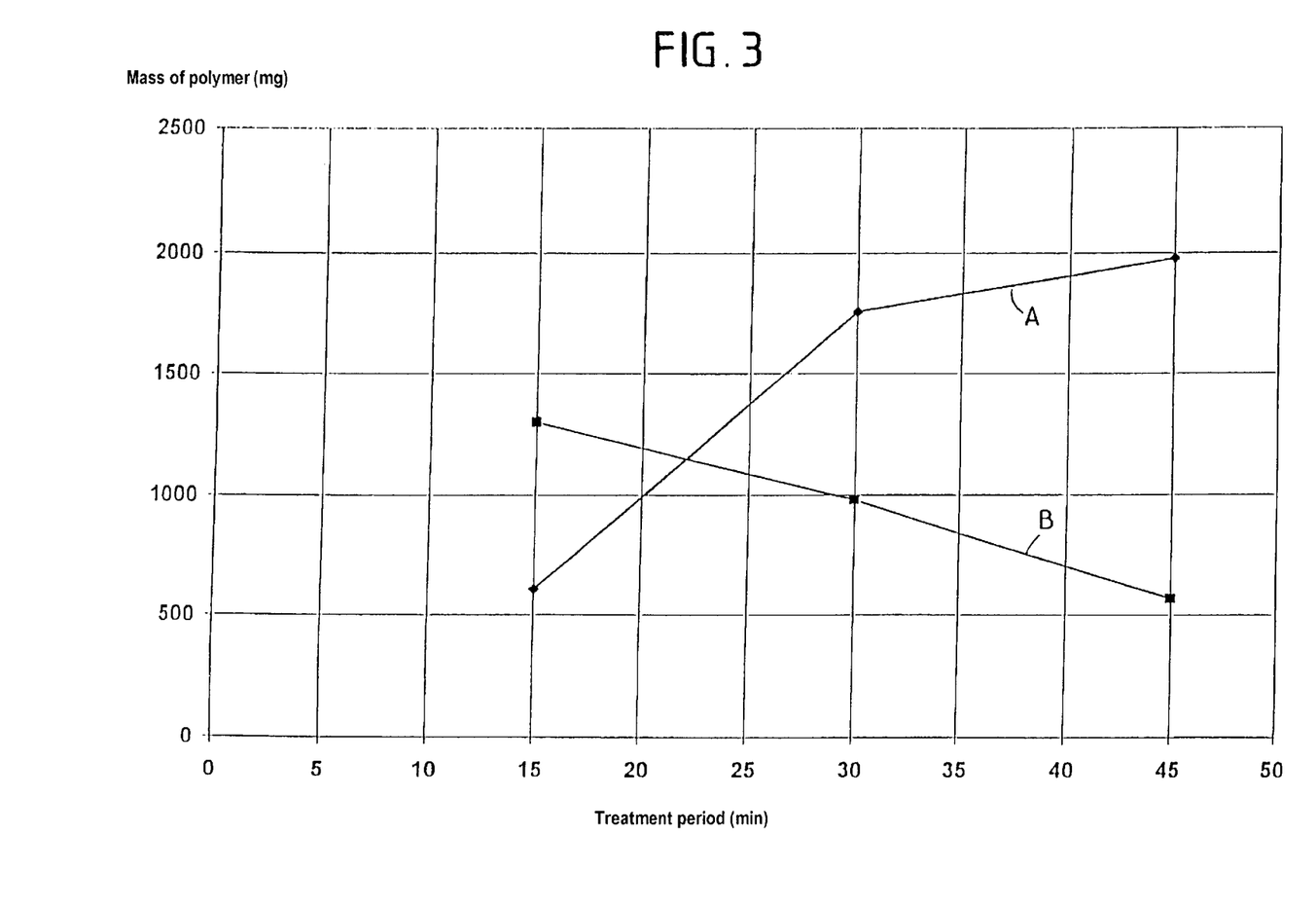
FIG. 3 shows the influence of the treatment period when the reaction is carried out at atmospheric pressure at 170° C.

FIG. 3 shows the influence of the treatment period when the reaction is carried out at atmospheric pressure at 170° C. Curve A of FIG. 3 shows the mass of insoluble copolymers obtained: curve B shows the mass of soluble copolymers obtained.

Figure 4:
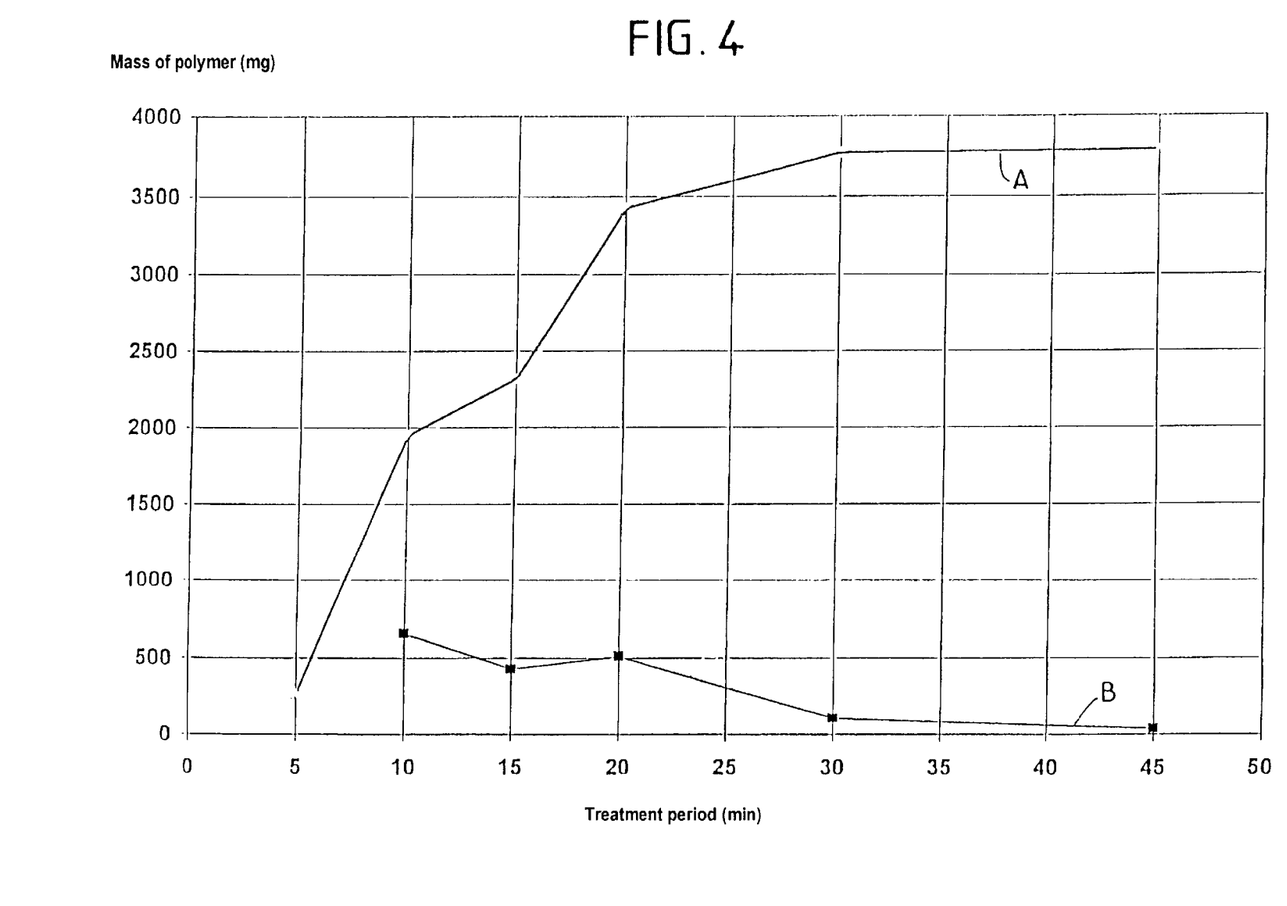
FIG. 4 shows the influence of the treatment period when the reaction is carried out in vacuo, at 170° C.

FIG. 4 shows the influence of the treatment period when the reaction is carried out in vacuo, at 170° C. Curve A of FIG. 4 shows the mass of insoluble copolymers obtained: curve B shows the mass of soluble copolymers obtained.

EXAMPLE 3

25 ml of an aqueous solution containing 100 g/l of β-cyclodextrin, 100 g/l of citric acid and 30 g/l of sodium hydrogen phosphate was prepared. The water was evaporated off from this solution in vacuo at 90° C. The solid residue from evaporation was heated at atmosphere pressure to 170° C. for 15 minutes. The solid reaction product was washed successively with three 60 ml volumes of water and with two 50 ml volumes of methanol. The first 60 ml wash water fraction was retained. The solid residue from washing was then dried at a temperature of 70° C. and weighed. The mass of insoluble cyclodextrin copolymer obtained was 0.6 g. The first fraction of 60 ml of wash water was dialyzed using a 12000–14000 d membrane for 60 hours against distilled water. The resulting dialyzed solution was freeze dried; the mass of soluble cyclodextrin copolymer obtained was 1.3 g.

EXAMPLE 4

25 ml of an aqueous solution containing 100 g/l of α-cyclodextrin, 100 g/l of citric acid and 30 g/l of sodium hydrogen phosphate was prepared. The water was evaporated off from this solution in vacuo at 90° C. The solid residue from evaporation was heated in vacuo to 170° C. for 30 minutes. The solid reaction product was washed successively with three 60 ml volumes of water and with two 50 ml volumes of methanol. The first 60 ml wash water fraction was retained. The solid residue from washing was then dried at a temperature of 70° C. and weighed. The mass of insoluble cyclodextrin copolymer obtained was 2.4 g. The first fraction of 60 ml of wash water was dialyzed using a 12000–14000 d membrane for 60 hours against distilled water. The resulting dialyzed solution was freeze dried; the mass of soluble cyclodextrin copolymer obtained was 0.14 g.

EXAMPLE 5

25 ml of an aqueous solution containing 100 g/l of γ-cyclodextrin, 100 g/l of citric acid and 30 g/l of sodium hydrogen phosphate was prepared. The water was evaporated off from this solution in vacuo at 90° C. The solid residue from evaporation was heated in vacuo to 170° C. for 30 minutes. The solid reaction product was washed successively with three 60 ml volumes of water and with two 50 ml volumes of methanol. The first 60 ml wash water fraction was retained. The solid residue from washing was then dried at a temperature of 70° C. and weighed. The mass of insoluble cyclodextrin copolymer obtained was 3.8 g. The first fraction of 60 ml of wash water was dialyzed using a 12000–14000 d membrane for 60 hours against distilled water. The resulting dialyzed solution was freeze dried; the mass of soluble cyclodextrin copolymer obtained was 0.08 g.

EXAMPLE 6

25 ml of an aqueous solution containing 100 g/l of βcyclodextrin, 100 g/l of polyacrylic acid and 30 g/l of sodium hypophosphite was prepared. The water was evaporated off from this solution in vacuo at 90° C. The solid residue from evaporation was heated in vacuo to 170° C. for 30 minutes. The solid reaction product was washed successively with three 60 ml volumes of water and with two 50 ml volumes of methanol. The first 60 ml wash water fraction was retained. The solid residue from washing was then dried at a temperature of 70° C. and weighed. The mass of insoluble cyclodextrin copolymer obtained was 3.8 g. The first fraction of 60 ml of wash water was dialyzed using a 12000–14000 d membrane for 60 hours against distilled water. The resulting dialyzed solution was freeze dried; the mass of soluble cyclodextrin copolymer obtained was 0.03 g.

EXAMPLE 7

25 ml of an aqueous solution containing 100 g/l of β-cyclodextrin, 100 g/l of 1,2,3,4-butanetetracarboxylic acid and 30 g/l of sodium dihydrogen phosphate was prepared. The water was evaporated off from this solution in vacuo at 90° C. The solid residue from evaporation was heated in vacuo to 170° C. for 10 minutes. The solid reaction product was washed successively with three 60 ml volumes of water and with two 50 ml volumes of methanol. The first 60 ml wash water fraction was retained. The solid residue from washing was then dried at a temperature of 70° C. and weighed. The mass of insoluble cyclodextrin copolymer obtained was 3.5 g. The first fraction of 60 ml of wash water was dialyzed using a 12000–14000 d membrane for 60 hours against distilled water. The resulting dialyzed solution was freeze dried; the mass of soluble cyclodextrin copolymer obtained was 0.03 g.

EXAMPLE 8

25 ml of an aqueous solution containing 100 g/l of β-cyclodextrin, 100 g/l of 1,2,3,4-butanetetracarboxylic acid and 30 g/l of sodium hypophosphite was prepared. The water was evaporated off from this solution in vacuo at 90° C. The solid residue from evaporation was heated in vacuo to 170° C. for 30 minutes. The solid reaction product was washed successively with three 60 ml volumes of water and with two 50 ml volumes of methanol. The first 60 ml wash water fraction was retained. The solid residue from washing was then dried at a temperature of 70° C. and weighed. The mass of insoluble cyclodextrin copolymer obtained was 4.0 g. The first fraction of 60 ml of wash water was dialyzed using a 12000–14000 d membrane for 60 hours against distilled water. The resulting dialyzed solution was freeze dried; the mass of soluble cyclodextrin copolymer obtained was 0.004 g.

EXAMPLE 9

The process was carried out using the method described in Example 1 without initially dissolving the citric acid, sodium hydrogen phosphate and β-cyclodextrin in water and without subsequent evaporation of the water. These reactants were mixed in the solid state and directly heated. The mass of insoluble cyclodextrin copolymer obtained was 3.2 g and the mass of soluble cyclodextrin copolymer obtained was 0.5 9.

EXAMPLE 10

The process was carried out using the method described in Example 1 without the presence of sodium hydrogen phosphate. The mass of insoluble cyclodextrin copolymer obtained was 3.0 g and the mass of soluble cyclodextrin copolymer obtained was 0.6 g.

Figure 5:
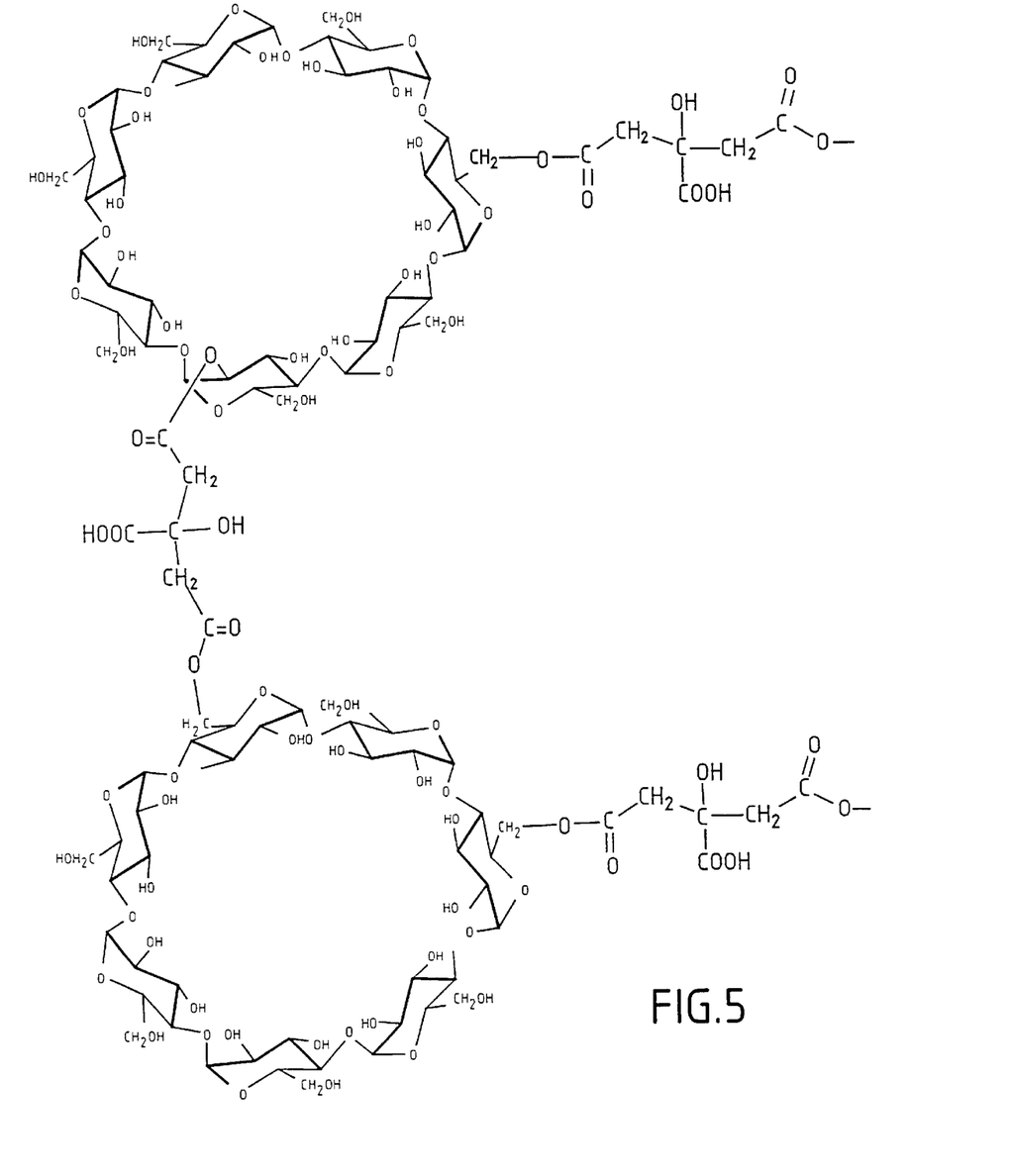
FIGS. 5, 6 and 7 show simplified line formulae of the copolymers obtained from citric acid, polyacrylic acid and butanetetracarboxylic acid respectively.
Figure 6:
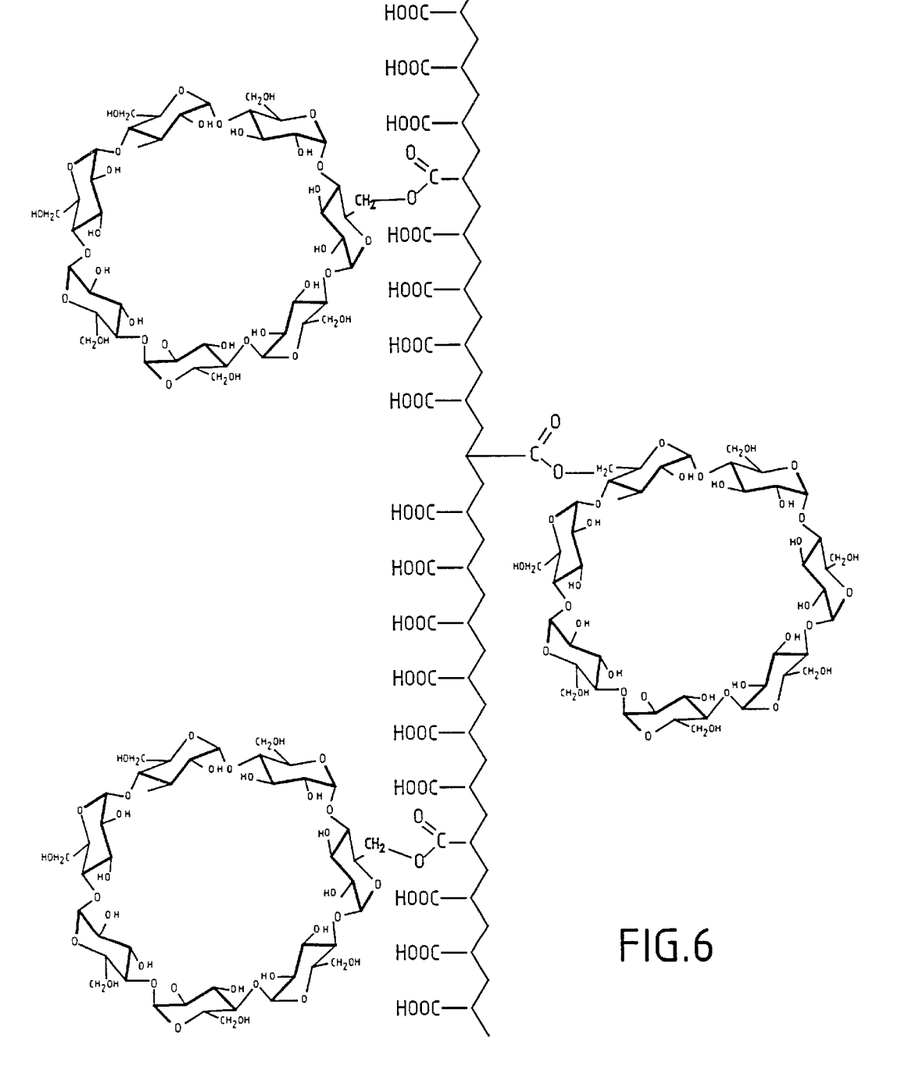
Figure 7:
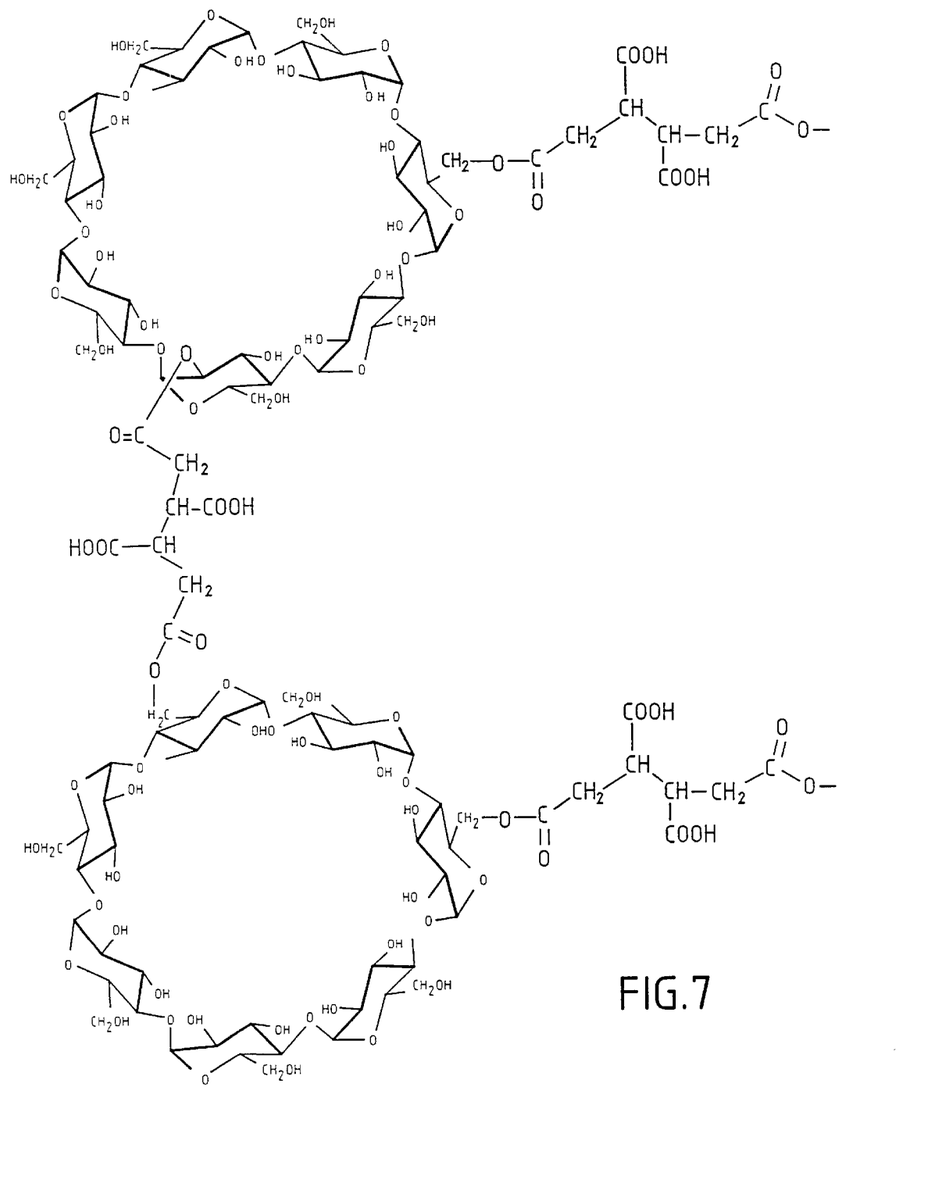

FIGS. 5, 6 and 7 show simplified line formulae of the copolymers obtained from citric acid, polyacrylic acid and butanetetracarboxylic acid respectively.

EXAMPLE 11

40 mg of the insoluble cyclodextrin copolymer obtained using the method described in Example 1 was placed in 40 ml of a solution containing 4.00 micromoles ($\mu$mol) of CI Basic Red 22 basic dye. After stirring for 30 min, 3.92 $\mu$mol (98%) of dye had been adsorbed by the copolymer. The same experiment was carried out using 40 ml of solution containing 16.00 $\mu$mol of the dye, in the presence of 20 mg of copolymer. After 30 min stirring, 15.65 $\mu$mol (98%) of the dye had been adsorbed.

EXAMPLE 12

40 mg of the insoluble cyclodextrin copolymer obtained using the method described in Example 1 was placed in 40 ml of a solution containing 4.00 μmol of CI Basic Green 4 (malachite green) basic dye. After stirring for 30 min, 100% of the dye had been adsorbed by the copolymer. The same experiment was carried out using 35 ml of solution containing 14.00 μmol of the dye, in the presence of 20 mg of copolymer. After 30 min stirring, 13.75 μmol (98%) of the dye had been adsorbed.

EXAMPLE 13

100 mg of the insoluble cyclodextrin copolymer obtained using the method described in Example 1 was placed in 40 ml of a solution containing 4.00 μmol of CI Direct Red 81 direct dye. After stirring for 65 hours, 2.54 μmol (64%) of the dye had been adsorbed by the insoluble cyclodextrin copolymer.

EXAMPLE 14

100 mg of the insoluble cyclodextrin copolymer obtained using the method described in Example 1 was placed in 40 ml of a solution containing 4.00 μmol of CI Acid Blue 15 acid dye. After stirring for 65 hours, 2.06 μmol (52%) of the dye had been adsorbed by the insoluble cyclodextrin copolymer.

EXAMPLE 15

40 mg of the insoluble cyclodextrin copolymer obtained using the method described in Example 1 was placed in 40 ml of a solution containing 20.00 μmol of 2-naphthol. After stirring for 24 hours, 5.60 μmol (28%) of the 2-naphthol had been adsorbed by the insoluble cyclodextrin copolymer.

EXAMPLE 16

100 mg of the insoluble cyclodextrin copolymer obtained using the method described in Example 4 was placed in 40 ml of a solution containing 20.00 μmol of benzaldehyde. After stirring for 65 hours, 5.94 μmol (30%) of the benzaldehyde had been adsorbed by the insoluble cyclodextrin copolymer.

EXAMPLE 17

100 mg of the insoluble cyclodextrin copolymer obtained using the method described in Example 5 was placed in 40 ml of a solution containing 20.00 μmol of caffeine. After stirring for 65 hours, 3.92 μmol (20%) of the caffeine had been adsorbed by the insoluble cyclodextrin copolymer.

EXAMPLE 18

Three solutions of 50 ml of $10^{-4}$ M CI Basic Red 22 basic dye were introduced into 12000–14000 d dialysis membranes. The first fraction contained the dye alone; the second contained the dye and 0.2837 g of β cyclodextrin (i.e., $5 \times 10^{-3}$ mol/l); the third contained the dye and 0.2837 g of soluble cyclodextrin copolymer obtained using the method described in Example 1. The three membranes with the three different dye solutions were each immersed in 250 ml of distilled water. Diffusion of the dye from the interior of the membrane into the distilled water surrounding the membrane was monitored by determining the absorbance of the external solution at 540 nanometers (nm). The absorbance values obtained for the external solutions for the three fractions after 5 hours of dialysis were 0.2722 for the first fraction, 0.1873 for the second fraction and only 0.0237 for the third fraction. These results confirm strong complexing of the dye by the soluble cyclodextrin copolymer, which was stronger than for cyclodextrin alone.

Figure 8:
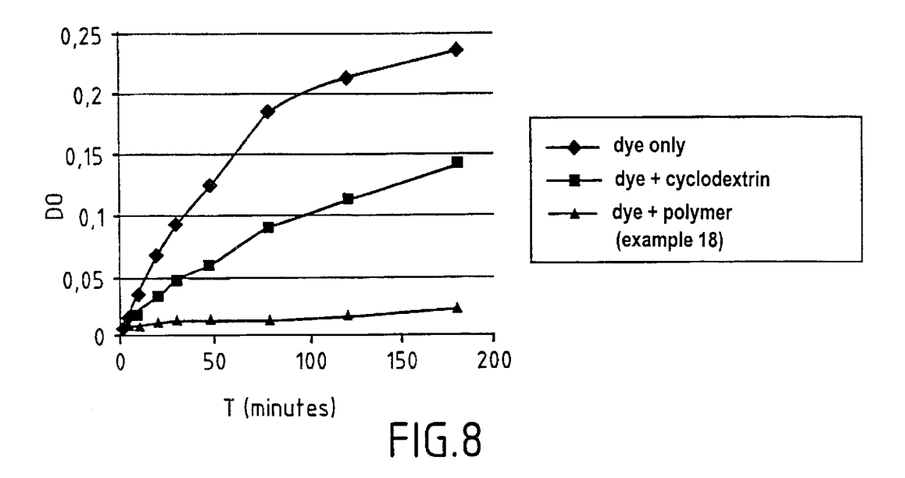
FIG. 8 shows the diffusion kinetics of CI Basic Red 22 basic dye through a semi-permeable membrane.

FIG. 8 shows the diffusion kinetics of CI Basic Red 22 basic dye through a semi-permeable membrane.

EXAMPLE 19

Three solutions of 50 ml of 10-3 M 2-naphthol were introduced into 12000–14000 d dialysis membranes. The first fraction contained 2-naphthol alone; the second contained the dye and 0.2837 g of β cyclodextrin (i.e., $5 \times 10^{-3}$ mol/l); the third contained the dye and 0.3317 g of the soluble cyclodextrin copolymer obtained using the method described in Example 1. The three membranes with the three different dye solutions were each immersed in 250 ml of distilled water. Diffusion of the dye from the interior of the membrane into the distilled water surrounding the membrane was monitored by determining the absorbance of the external solution at 327 nm. The absorbance values obtained for the external solutions for the three fractions after 76 hours of dialysis were 0.2865 for the first fraction, 0.3030 for the second fraction and only 0.2574 for the third fraction.

Figure 9:
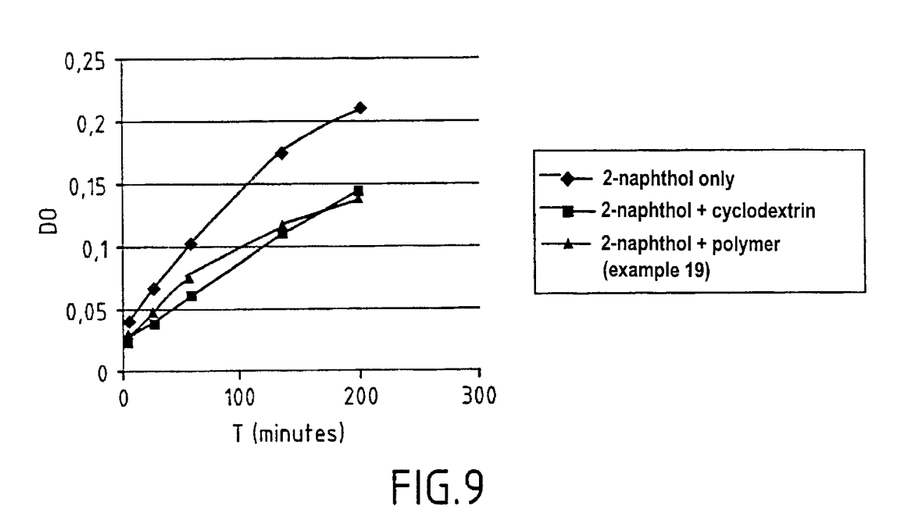
FIG. 9 shows the diffusion kinetics of 2-naphthol through a semi-permeable membrane.

FIG. 9 shows the diffusion kinetics of 2-naphthol through a semi-permeable membrane.

EXAMPLE 20

The ion exchange capacities of insoluble cyclodextrin polymers obtained using the method described in Examples 1, 6 and 7 were determined using a known method. These ion exchange capacities were respectively 2.84 millimoles/gram (mmol/g) for the citric acid-based copolymer, 4.03 mmol/g for the copolymer based on poly(acrylic) acid and 3.76 mmol/g for the copolymer based on 1,2,3,4-butanetetracarboxylic acid.

EXAMPLE 21

The process of Example 1 was carried out, modifying the quantity of citric acid. The citric acid concentration in the reaction mixture was 60 g/l. 1.6 g of insoluble cyclodextrin polymer was obtained. The swelling ratio of this copolymer, determined using a known method, was 11.30.

What is claimed is:

1. A process for producing water-soluble and water-insoluble copolymers of cyclodextrin(s) or cyclodextrin derivative(s), wherein the repeating unit of the structure has the following general formula:

in which y is the number of repetitions of the unit; and in which [CD] is selected from the group consisting of: cyclodextrin(s), cyclodextrin derivative(s), inclusion complex(es) of cyclodextrin(s), inclusion complex(es) of cyclodextrin derivative(s); and represents the molecular chain of a poly(carboxylic) acid in which at least two carboxylic acid functions have been esterified, and which supports at least one non esterified carboxylic acid function, wherein [AC] represents the carbon backbone of said poly(carboxylic) acid;

the process comprising the following operations:
preparing a solid state mixture comprising at least one element selected from the group consisting of: cyclodextrin(s), cyclodextrin derivative(s), inclusion complex(es) of cyclodextrin(s), inclusion complex(es) of cyclodextrin derivative(s); and at least one element selected from the group consisting of: poly(carboxylic acid), poly(carboxylic acid) anhydride, mixture of poly(carboxylic acid) and poly(carboxylic acid) anhydride; and optionally, a catalyst; and heating the mixture to a temperature in the range of 100° C. to 200° C. for a period in the range of 1 min to 60 min.

2. A process according to claim 1, wherein, in order to obtain the solid state mixture, an aqueous solution comprising at least one element selected from the group consisting of: cyclodextrin(s), cyclodextrin derivatives), inclusion complex(es) of cyclodextrin(s), inclusion complex(es) of cyclodextrin derivative(s); and at least one element selected from the group consisting of: poly(carboxylic acid), poly(carboxylic acid) anhydride, mixture of poly(carboxylic acid) and poly(carboxylic acid) anhydride; and optional catalyst is prepared, and wherein the water is evaporated from said solution at a temperature in the range of 40° C. to 100° C.

3. A process according to claim 1, for the production of copolymers of cyclodextrin(s) or cyclodextrin derivative(s), wherein the solid product obtained after heating is washed with copious quantities of water, then dried.

4. A process according to claim 3, wherein the mixture is heated to a temperature of 150° C. or more, for a period of 30 minutes or more, to produce mainly an insoluble copolymer.

5. A process according to claim 3, wherein the mixture is heated to a temperature of 180° C. in vacuo for 30 minutes.

6. A process according to claim 1 for the production of soluble copolymers of cyclodextrin(s) or cyclodextrin derivative(s), wherein:
the solid product obtained after heating is washed with copious quantities of water then filtered;
the soluble copolymer is isolated from the filtrate.

7. A process according to claim 6, wherein the mixture is heated to a temperature in the range of 100° C. to 140° C., for a period in the range of 1 min to 30 min.

8. A process according to claim 6, wherein the mixture is heated to a temperature of 130° C. in vacuo, for 30 minutes.

9. A process according to claim 1, wherein the catalyst is selected from dihydrogen phosphates, hydrogen phosphates, phosphates, hypophosphites, alkali metal phosphates, alkali metals salts of polyphosphoric acids, carbonates, bicarbonates, acetates, borates, alkali metal hydroxides, aliphatic amines and ammonia.

10. A process according to claim 1, wherein the cyclodextrin is selected from α-cyclodextrin, β-cyclodextrin and γ-cyclodextrin and in that the cyclodextrin derivatives are selected from hydroxypropyl, methyl or acetyl derivatives of α-cyclodextrin, β-cyclodextrin and γ-cyclodextrin and inclusion complexes formed from said cyclodextrins and said cyclodextrin derivatives.

11. A process according to claim 1, wherein the poly(carboxylic) acid and poly(carboxylic) acid anhydride used in the process of the invention are selected from the following poly(carboxylic) acids and poly(carboxylic) acid anhydrides: saturated and unsaturated acyclic poly(carboxylic) acids, saturated and unsaturated cyclic poly(carboxylic) acids, aromatic poly(carboxylic) acids, and hydroxypoly(carboxylic) acids.

12. The process of claim 11, wherein said poly(carboxylic) acids and poly(carboxylic) acid anhydrides are selected from the group consisting of citric acid, poly(acrylic) acid, poly(methacrylic) acid, 1,2,3,4-butanetetracarboxylic acid, maleic acid, citraconic acid, itaconic acid, 1,2,3-propane-tricarboxylic acid, aconitic acid, all-cis-1,2,3,4-cyclopentanetetracarboxylic acid, mellitic acid, oxydisuccinic acid, and thiodisuccinic acid.

13. Copolymers of cyclodextrin(s) or cyclodextrin derivative(s), wherein the repeating unit of the structure has the following general formula:

in which y is the number of repetitions of the unit; and in which [CD] represents a cyclodextrin molecule or a cyclodextrin derivative or an inclusion complex of cyclodextrin molecules or cyclodextrin derivatives; and represents a molecular chain of poly(carboxylic) acid in which at least two carboxylic acid functions have been esterified, and which supports at least one non esterified carboxylic acid function, wherein [AC] represents the carbon backbone of said poly(carboxylic) acid.

14. Copolymers of claim 13, wherein [CD] represents a derivative selected from the group consisting of (1) α-cyclodextrin, β-cyclodextrin or γ-cyclodextrin, (2) a α-cyclodextrin, β-cyclodextrin or γ-cyclodextrin derivative and (3) an inclusion complex of said cyclodextrins or said cyclodextrin derivatives.

15. Copolymers according to claim 13, wherein the poly(carboxylic) acid is selected from saturated or unsaturated acyclic poly(carboxylic) acids, saturated and unsaturated cyclic poly(carboxylic) acids, aromatic poly(carboxylic) acids, and hydroxypoly(carboxylic) acids.

16. Copolymers of claim 14, wherein said poly(carboxylic) acid is selected from the group consisting of citric acid, poly(acrylic) acid, poly(methacrylic) acid, 1,2,3,4-butanetetracarboxylic acid, maleic acid, citraconic acid, itaconic acid, 1,2,3-propane-tricarboxylic acid, aconitic acid, all-cis-1,2,3,4-cyclopentanetetracarboxylic acid, mellitic acid, oxydisuccinic acid, and thiodisuccinic acid.

17. Copolymers of claim 14, wherein said α-cyclodextrin, β-cyclodextrin or γ-cyclodextrin derivative is selected from the group consisting of a hydroxypropyl or methyl α-cyclodextrin, β-cyclodextrin and γ-cyclodextrin derivative and an inclusion complex of said cyclodextrins and said cyclodextrin derivatives.

* * * * *

UNITED STATES PATENT AND TRADEMARK OFFICE
CERTIFICATE OF CORRECTION

PATENT NO. : 6,660,804 B1
DATED : December 9, 2003
INVENTOR(S) : Marek Weltrowski et al.

It is certified that error appears in the above-identified patent and that said Letters Patent is hereby corrected as shown below:

Column 5,
Line 33, "chat" should read -- that --;

Column 7,
Line 44, "reprsents" should read -- represents --;
After line 48, insert the following paragraph:

-- These copolymers can in particular, but not exclusively, be obtained by the process of the present invention. They are linear and/or branched and/or cross-linked and may or may not be soluble. --;

Column 10,
Line 42, "0.5 9." should read -- 0.5g. --; and

Column 12,
Line 5, "10-3" should read -- $10^{-3}$ --.

Signed and Sealed this

Twenty-fourth Day of August, 2004

JON W. DUDAS
*Director of the United States Patent and Trademark Office*